Figures 1, 2:
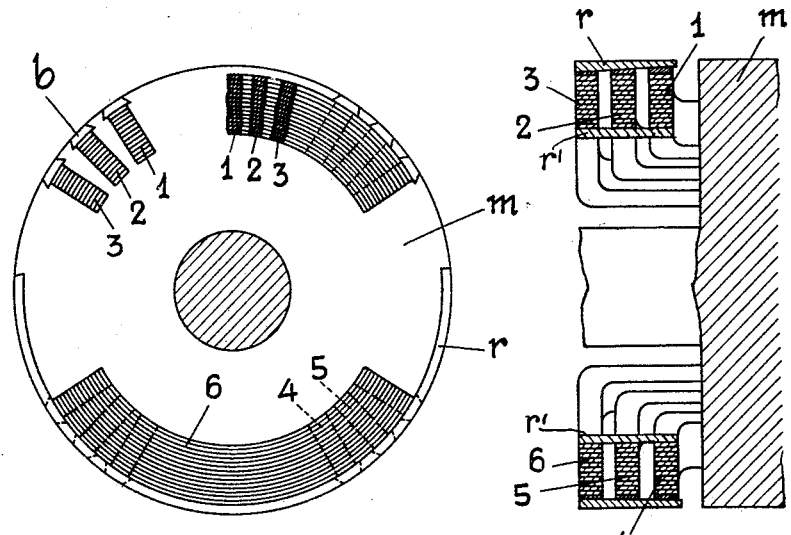

Sept. 8, 1931.   O. T. BLÁTHY   1,822,723
ROTATING FIELD MAGNET FOR TURBO GENERATORS
Filed May 17, 1928   2 Sheets-Sheet 1

Inventor:
O. T. Bláthy
By
Langner, Parry, Card & Langner
Attys.

Sept. 8, 1931. O. T. BLATHY 1,822,723
ROTATING FIELD MAGNET FOR TURBO GENERATORS
Filed May 17, 1928 2 Sheets-Sheet 2

Inventor:-
Otto T Blathy
by ╌╌╌╌╌╌╌
Atty.

Patented Sept. 8, 1931

1,822,723

UNITED STATES PATENT OFFICE

OTTO TITUS BLÁTHY, OF BUDAPEST, HUNGARY

ROTATING FIELD MAGNET FOR TURBO-GENERATORS

Application filed May 17, 1928, Serial No. 278,595, and in Austria March 26, 1928.

This invention relates to an improvement in or modification of the rotating field magnet for turbo generators claimed in the present applicant's prior U. S. Patent 1,703,810, granted February 26, 1929 wherein the coils of the field winding (which are formed of bare metal strip disposed in slots in the iron magnet core closed by means of metallic wedges) are connected in parallel in such a way that the outermost turns of the coils are in electroconducting connection with the iron core thus facilitating the dissipation of the heat generated in the coils.

In the drawing of the prior patent a rotor is illustrated in which the slots are arranged in parallel planes. If, however, the coils are disposed in radial slots in the rotor a further advantage is obtained for the arrangement protected by the prior patent in addition to the increased rate of heat dissipation. As with this arrangement of the coils, portions of them project considerably beyond the iron core, a cap must therefore be provided to support these portions against the action of centrifugal force. This cap must necessarily be insulated from the coils and this insulation not only hinders the cooling of the coils but also yields under the action of centrifugal force and thus affects the balancing of the rotor.

According to the present invention these disadvantages are obviated by providing one or more supporting rings in electroconductive contact with the outermost turns of the coils where they project beyond the rotor. Preferably metallic strips are secured to the projecting portions of the coils in order to strengthen the outermost turns, and, in addition, the surfaces of contact between the supporting ring or rings and the projecting portions of the coils may be made conical. Again instead of employing solid metal rings, these rings may be constituted by a number of turns of wire wound on over the projecting portions of the coils.

Figure 3:
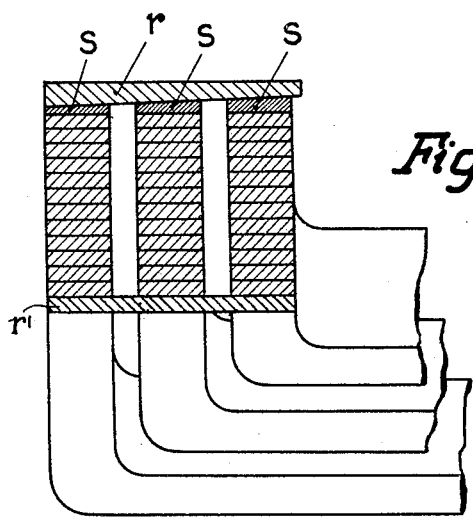
Figure 4:
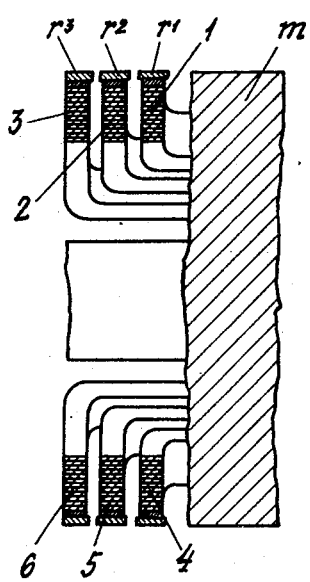
Figure 5:
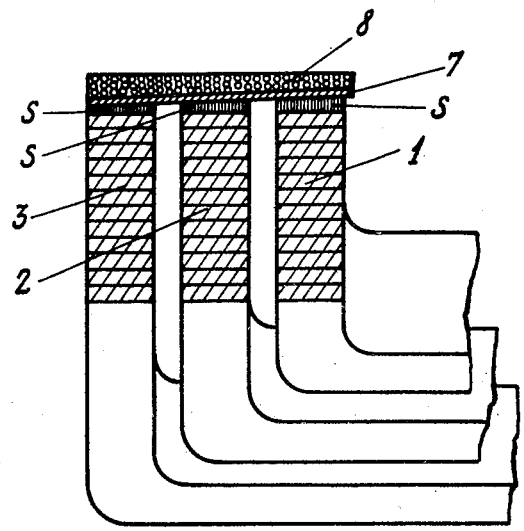
Figure 6:
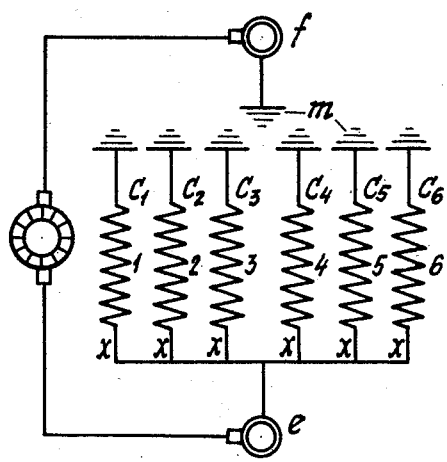
Figure 7:
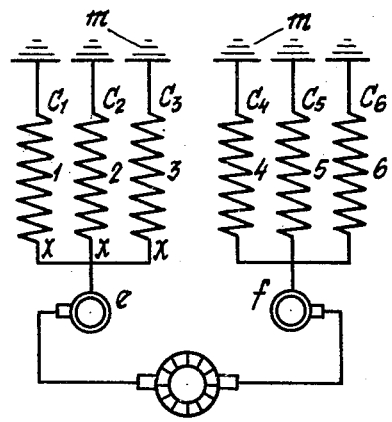

Several arrangements according to the invention are illustrated by way of example in the accompanying drawings, in which Figure 1 is a longitudinal cross-section through one end of a two-pole field magnet having field coils disposed in radial slots, Figure 2 illustrates the field magnet in elevation, the upper half being in cross-section, Figure 3 is a longitudinal section through the projecting portions of the coils and their supporting ring to an enlarged scale, Figs. 4 and 5 show modifications of the retaining ring constructions, while Figs. 6 and 7 are schematic diagrams of the wiring connections.

In the construction illustrated in the drawings the coils, 1, 2, 3 and 4, 5, 6 are disposed in radial slots in the iron magnet core $m$, these slots being closed by means of wedges $b$ (see Figure 2). The outermost turn of each coil is in metallic contact with a wedge while the other ends of the coils are connected to the slip ring of the rotor. The portions of the coils which project from the rotor are bent into a circular form in the usual manner, the projecting portions of the coils 1 and 4 being adjacent to the core $m$ and those of the coils 2 and 5 lying further out whilst the corresponding portions of the coils 3 and 6 project to the greatest distance from the core.

In order to support these projecting portions of the coils a metal ring $r$ is fitted on over them so as to be in direct metallic contact with the outermost turn of each coil, no insulation being interposed between the ring and the coils. This arrangement is rendered possible by the fact that the coils are connected in parallel at one end to a common slip ring, and at the other end by direct metallic contact with the iron core $m$ as described in the specification of the prior patent. In the disclosure illustrated and described therein, the coils in each slot are connected at one end in parallel relation to those coils in the other slots, and to a common lead, preferably to a slip ring of the rotor. The other ends of the coils are in substantially direct metallic contact with the iron core $m$. To modify the circuit according to that disclosure to adapt it for use in conjunction with the present invention, it is necessary merely to interpose the ring between the outer ends of the coils and the core, at the same time establishing electrical connection between the ring and the core.

The outermost turn of each coil is preferably made from stronger metal than that of the remaining coils or, as shown in Figure 3, a metal covering strip *s* may be, for example, soldered on to the outer surfaces of these outermost turns in such a way that sufficient material is present to enable the outer surfaces of the projecting portions of the coils to be turned down to receive the supporting ring *r*. In order to facilitate the application of the supporting ring and to secure it more firmly, the surfaces of contact between it and the coils or the strips *s* may be turned conical as shown in Figure 3. In some cases, however, it may be simpler and more convenient to make these surfaces cylindrical.

Instead of employing a single supporting ring, a number of such rings may be used for example, one ring for each range of coils. Such construction is shown in Fig. 4, wherein the ring $r^1$ encircles the coil 1, while rings $r^2$ and $r^3$ respectively encircle coils 2 and 3. Also if desired, the supporting ring may be formed by winding on wire in a known manner, thin sheet metal being first laid on so that it is in metallic contact both with the outermost conductor in the projecting portion of each coil and also with the wires. Such construction is exemplified in Fig. 5, wherein the thin metal sheet is shown at 7 and the wire wound thereabout is illustrated at 8. The relation of the ring thus produced to the end coils is clearly evident, the metal covering strip *s* and coils 1, 2, and 3 being shown in detail.

In the modification described in the specification of the present applicant's prior Patent Number 1,703,810, the innermost turns of the coils may also be in metallic contact with the iron core of the rotor. In such cases, in addition to providing an exterior supporting ring, such as the ring *r*, an internal ring supporting ring or flange may also be provided in direct metallic contact with the projecting portions of the coils at their inner face so as to support them also. This is shown in Figs. 1 and 3, where the internal ring is indicated at —*r'*—.

The coils 1–6 (Figure 6) are connected in multiple at their inner ends adjacent to the bottom of the slots and are connected to one common line conductor —*e*—, while the other ends of all the coils are in electro-conductive contact with the iron core —*m*— of the field magnet. The body of the iron core —*m*— is connected to the second line conductor —*f*—.

The above arrangement allows to reduce the thickness of the insulation —*a*— substantially, while no insulation is necessary between the wedges —*b*— and the outermost turn of the coils as this latter can be in electroconductive contact with the iron core —*m*—. Hence the transfer of heat from the coils to the iron core is facilitated so that owing to the more efficient cooling of the coils, the load-capacity of the winding is considerably increased. Owing to the reduction of the thickness and the partial omission of the insulation the space available for the conductors within the slots is increased. The lack of the outermost layer of insulation enables the magnet to remain substantially completely operative even after a stator fire, since such fire damages only the outside layer of insulation.

A more convenient arrangement is shown in Figure 7, in which half of the number of coils 1, 2, 3 and 4, 5, 6 respectively are connected in multiple at their inner ends —*x*— by means of a common line conductor —*e*— or —*f*— respectively, while the outer ends of the coils are in electroconductive contact with the iron core —*m*—.

What I claim is:—

1. In a rotating field magnet for turbo generators, an iron core having a plurality of radial slots therein, two collector rings connected therewith, coils wound of metal strips of the breadth of the slots within said slots, metallic wedges closing the circumferential openings of said slots to secure said coils in said slots, said coils being by means of the outermost turns in metallic contact with said iron core, means connecting said coils at one of their turns in multiple and with one of said collector rings, bent cylindrical coil heads projecting beyond said iron core, and metallic rings fitted onto the cylindrical surface of said coil heads and in metallic contact with the end turn of said coils.

2. In a rotating field magnet for turbo generators, an iron core having a plurality of radial slots therein, two collector rings connected therewith, coils wound of metal strips of the breadth of the slots within said slots, metallic wedges closing the circumferential openings of said slots to secure said coils in said slots, said coils being by means of the outermost turns in metallic contact with said iron core, means connecting said coils at one of their turns in multiple and with one of said collector rings, bent coil heads projecting beyond said iron core and having outer cylindrical surfaces of the same radius, and a common metallic ring fitted onto the cylindrical surfaces of all of said coil heads and in metallic contact with the end turn of said coils.

3. In a rotating field magnet for turbo generators, an iron core having a plurality of radial slots therein, two collector rings connected therewith, coils wound of metal strips of the breadth of the slots within said slots, metallic wedges closing the circumferential openings of said slots to secure said coils in said slots, said coils being by means of the outermost turns in metallic contact with said iron core, means connecting said coils at one of their turns in multiple and with one of said collector rings, bent cylindrical coil heads projecting beyond said iron core, metallic strips disposed against and in electrical contact with the end turns of the coils, and metallic rings surrounding the cylindrical surface of said coil heads coated with said strips and in metallic contact therewith.

4. In a rotating field magnet for turbo generators, an iron core having a plurality of radial slots therein, two collector rings connected therewith, coils wound of metal strips of the breadth of the slots within said slots, metallic wedges closing the circumferential openings of said slots to secure said coils in said slots, said coils being by means of the outermost turns in metallic contact with said iron core, means connecting said coils at one of their turns in multiple and with one of said collector rings, bent cylindrical coil heads projecting beyond said iron core, metallic strips disposed against and in electrical contact with the end turns of the coils, and a common metallic ring surrounding the cylindrical surface of said coil heads coated with said strips and in metallic contact therewith.

5. In a rotating field magnet for turbo generators, an iron core having a pluarlity of radial slots therein, two collector rings connected therewith, coils wound of metal strips of the breadth of the slots within said slots, metallic wedges closing the circumferential openings of said slots to secure said coils in said slots, said coils being by means of the outermost turns in metallic contact with said iron core means connecting said coils at one of their turns in multiple and with one of said collector rings, bent cylindrical coil heads projecting beyond said iron core, and metallic rings consisting of a number of turns of non-insulated wire wound about the end turns of said coil heads and in metallic contact therewith.

In testimony whereof I affix my signature.

OTTO TITUS BLÁTHY.